United States Patent [19]

Reardon

[11] Patent Number: 4,586,526

[45] Date of Patent: May 6, 1986

[54] ARRANGEMENT FOR CONTROLLING COMMUNICATION BETWEEN A TUBULAR MEMBER AND AN INFLATABLE ELEMENT SUPPORTED ON THE TUBULAR MEMBER IN A WELL BORE

[75] Inventor: Daniel R. Reardon, Houston, Tex.

[73] Assignee: N. J. McAllister Petroleum Industries, Inc., Canada

[21] Appl. No.: 778,280

[22] Filed: Sep. 18, 1985

Related U.S. Application Data

[63] Continuation of Ser. No. 553,095, Nov. 18, 1983, abandoned.

[51] Int. Cl.[4] .......................................... E21B 33/127
[52] U.S. Cl. ....................................... 137/70; 137/71; 137/461; 137/614.2; 166/187
[58] Field of Search ................ 137/70, 71, 461, 614.2, 137/614.21, 505.12; 166/187

[56] References Cited

U.S. PATENT DOCUMENTS

| | | | |
|---|---|---|---|
| 1,191,963 | 7/1916 | Gastafson | 137/614.2 X |
| 1,473,155 | 11/1923 | Mattingly et al. | 137/614.2 X |
| 2,245,210 | 6/1941 | McElwaine | 137/505.12 |
| 3,092,143 | 6/1963 | Denman | 137/624.14 |
| 3,160,486 | 12/1964 | Busch | 137/624.14 X |
| 3,427,651 | 2/1969 | Bilstein et al. | 166/187 X |
| 3,810,484 | 5/1974 | Martini | 137/70 |
| 3,818,922 | 6/1974 | Malone | 137/70 |
| 4,131,235 | 12/1978 | Lieding | 137/614.21 X |
| 4,260,164 | 4/1981 | Baker et al. | 137/70 X |
| 4,420,159 | 12/1983 | Wood | 166/187 X |

Primary Examiner—Martin P. Schwadron
Assistant Examiner—Stephen M. Hepperle
Attorney, Agent, or Firm—Mason M. Campbell

[57] ABSTRACT

A valve housing is adapted to be supported on a tubular member, there being bore means in the valve housing. Passage means are provided in the tubular member and in the valve housing for communicating fluid from the interior of the tubular member through the bore means to the interior of an inflatable element carried by the tubular member for inflation of the inflatable element. First valve means in the bore means control fluid flow into the bore means, and second valve means in the bore means control fluid flow from the bore means to the inflatable element. Means retain the second valve means in position in the bore means to close off flow to the inflatable element until a first predetermined pressure is reached in the bore means and for releasing the second valve means so that it may move to communicate the bore means for flow to the interior of the inflatable element when the first predetermined pressure is reached. Means retain the first valve in position in the bore means to accommodate flow to the bore means until a second predetermined pressure, which is higher than the first predetermined pressure, is reached in the bore means, and for releasing the first valve means to move and close off flow from the tubular member to said bore means when the second predetermined pressure is reached. The inflating pressure and annulus well bore pressure assist in retaining the second valve means closed after the element has been inflated.

26 Claims, 16 Drawing Figures

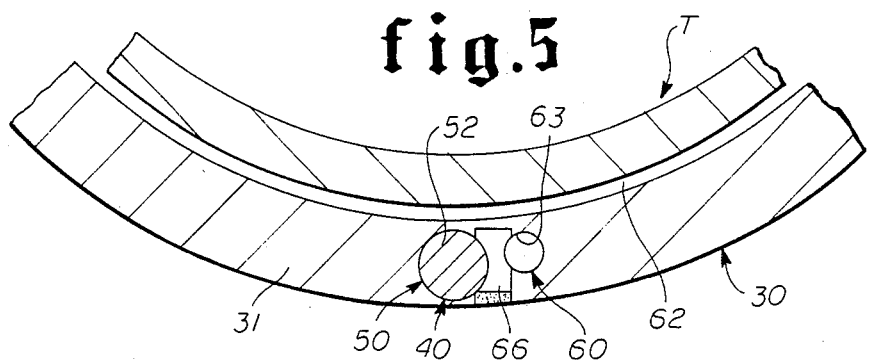
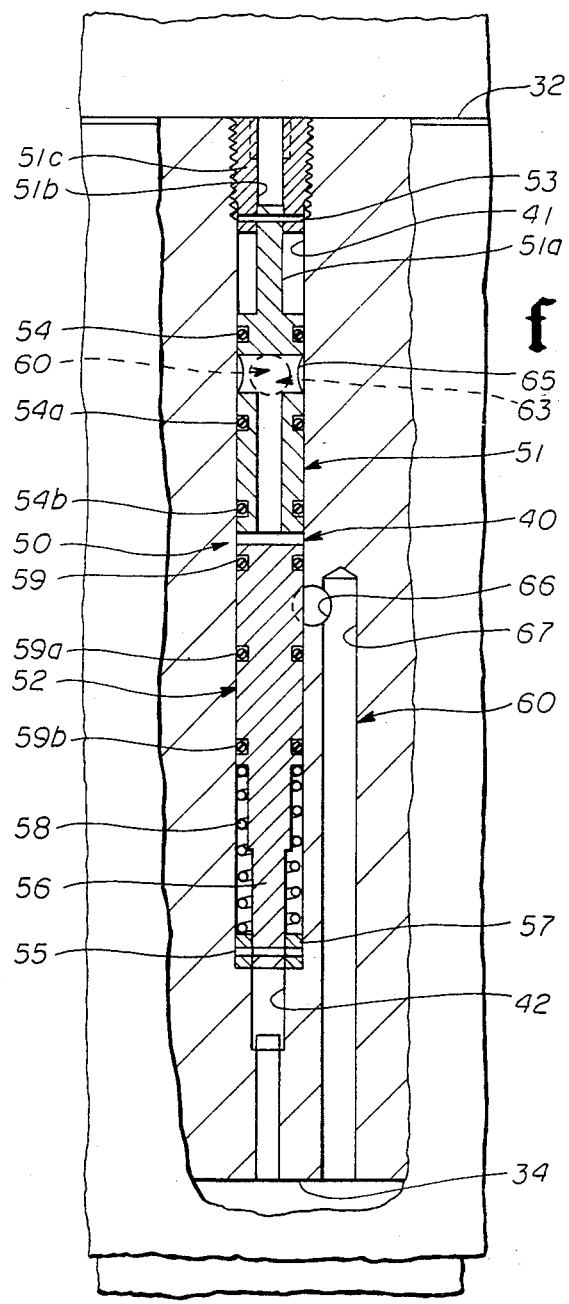
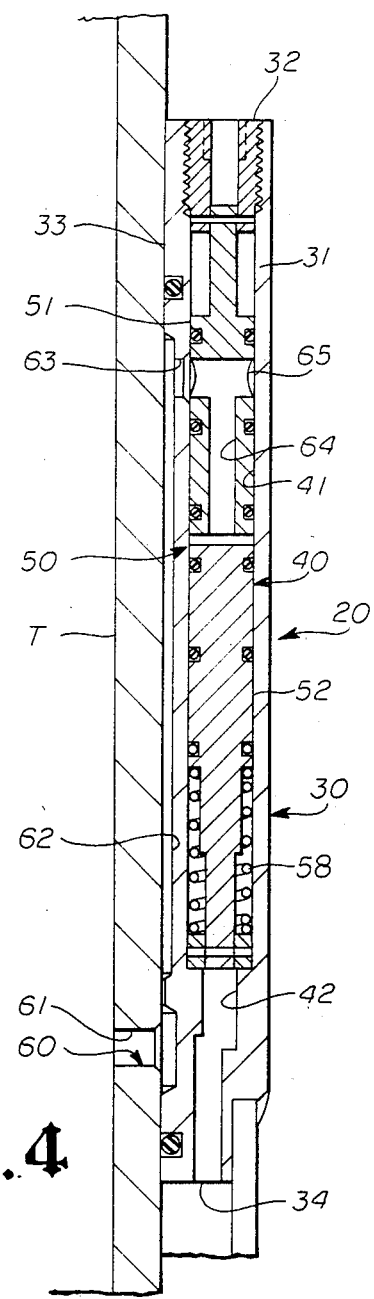

ARRANGEMENT FOR CONTROLLING COMMUNICATION BETWEEN A TUBULAR MEMBER AND AN INFLATABLE ELEMENT SUPPORTED ON THE TUBULAR MEMBER IN A WELL BORE

CROSS REFERENCE TO RELATED APPLICATION

This a continuation of application Ser. No. 553,095, filed Nov. 18, 1983 now abandoned.

This application is related to an invention disclosed and claimed in my copending application Ser. No. 553,094 filed in the United States Patent and Trademark Office on the eighteenth day of November, 1983, for "Arrangement for Controlling Communication Between a Tubular Member and an Inflatable Element Supported on the Tubular Member in a Well Bore".

SUMMARY OF THE INVENTION

Various types of control valve arrangements have been provided and are in use for controlling fluid communication between the interior of a tubular member and the interior of an inflatable element supported externally on the tubular member in a well bore for providing inflating fluid to the inflatable element and thereafter positioning the valve arrangement to maintain the inflatable fluid within the element. Some of such devices includes structure which retains or locks the valve arrangement in a position to endeavor to prevent communication between the tubular member and the inflated element after it has been inflated. However, applicant is unaware of any valve arrangement which blocks fluid communication from the tubular member to the valve arrangement and from the inflated element to the valve arrangement which would tend to release the inflating fluid from the inflated element after it has been inflated to the desired pressure.

After the element has been inflated, it is desirable during subsequent well operations to block communication of fluid from the tubular member to the valve control arrangement so as to prevent passage of fluid to the inflated element after inflation thereof which might cause overinflation of the element during any subsequent well treatment.

Some of such prior art devices have employed various locking mechanisms to maintain the valve arrangement in a desired position to block off further flow to the inflated element after it has been inflated to a predetermined pressure. In some instances, such prior art locking mechanisms are exposed to annulus pressure between the tubular member and the well bore wall in which the inflated element is positioned, and in the event that the annulus pressure became excessive, such pressure might overcome the locking mechanism thus releasing the valve arrangement from its locked position and expose the inflated element to communication with the tubular member on which it is positioned.

Some of such prior art valve control arrangements are also arranged in a valve collar which is connected to form part of the tubular member which substantially increases the cost of construction and may complicate fabrication and assembly of the valve control arrangement as well as repair and replacement thereof.

An object of the present invention is to provide a valve control arrangement for controlling fluid communication between the interior of a tubular member and the interior of an inflatable element supported externally on the tubular member, which arrangement includes second valve means, means to retain the second valve means closed to prevent communication to the inflatable element until a first predetermined pressure is reached and which then releases the second valve means for communicating fluid to the inflatable element, first valve means which normally communicates fluid to the second valve means from the tubular member for inflating the inflatable element when the first predetermined pressure is reached, means to retain the first valve means in fluid communication with the tubular member until a second predetermined pressure is reached and which then releases the first valve means so that it may move to close off further communication between the tubular member and the valve arrangement which might tend to cause overinflation of the element.

An object of the present invention is to provide a valve control arrangement for controlling fluid communication between the interior of a tubular member and the interior of an inflatable element supported externally on the tubular member, which arrangement includes second valve means, means to retain the valve means closed to prevent communication to the inflatable element until a first predetermined pressure is reached and which then releases the second valve means for communicating fluid to the inflatable element, first valve means which normally communicates fluid to the second valve means from the tubular member for inflating the inflatable element when the first predetermined pressure is reached, means to retain the first valve means in fluid communication with the tubular member until a second predetermined pressure is reached and which then releases the first valve means so that it may move to thereafter block communication between the tubular member and the valve arrangement, said valve arrangement being constructed and arranged so that the inflated pressure within the inflatable element acts on the second valve means tending to urge it to a position to block, or prevent communication between the inflated element and the tubular member blocked off.

Yet a further object of the present invention is to provide a valve arrangement for controlling fluid communication between the interior of a tubular member and an inflatable element supported externally on the tubular member, which valve arrangement may be positioned in an annular valve housing, which valve housing can be slipped over the tubular member and secured in position thereon by any suitable means.

Yet a further object of the present invention is to provide an arrangement for controlling fluid communication between the interior of a tubular member and an inflatable element supported externally on the tubular member including valve means for preventing communication from the tubular member to the valve arrangement after the inflatable element has been inflated and which utilizes annulus pressure to urge the valve means to a position for preventing communication between the inflated element and the tubular member after the inflatable element has been inflated.

Yet a further object of the present invention is to provide an arrangement for controlling fluid communication between the interior of a tubular member and an inflatable element supported externally on the tubular member including valve means for preventing communication from the tubular member to the valve arrangement after the inflatable element has been inflated and for preventing communication between the inflatable element and the tubular member after the inflatable element has been inflated; the valve means which prevents communication between the inflated element and the tubular member after inflation of the inflatable element being constructed and arranged so that it is responsive to pressure within the inflated element and to pressure within the annulus in which the tubular member and inflated element are positioned so that the valve means is urged to a position to prevent communication between the inflated element and the tubular member.

Other objects and advantages of the present invention will become apparent from a consideration of the following description and drawings.

BRIEF DESCRIPTION OF THE DRAWINGS

FIG. 3 is a sectional view of a portion of the valve housing illustrating details of one form of the valve arrangement;

FIG. 4 is a sectional view on the line 4—4 of FIG. 1 illustrating further structural details of one form of the valve arrangement;

FIG. 5 is a sectional view on the line 5—5 of FIG. 1 illustrating an arrangement of the bore means and passage means in one embodiment of the present invention;

DESCRIPTION OF THE PREFERRED EMBODIMENTS

Figure 6:
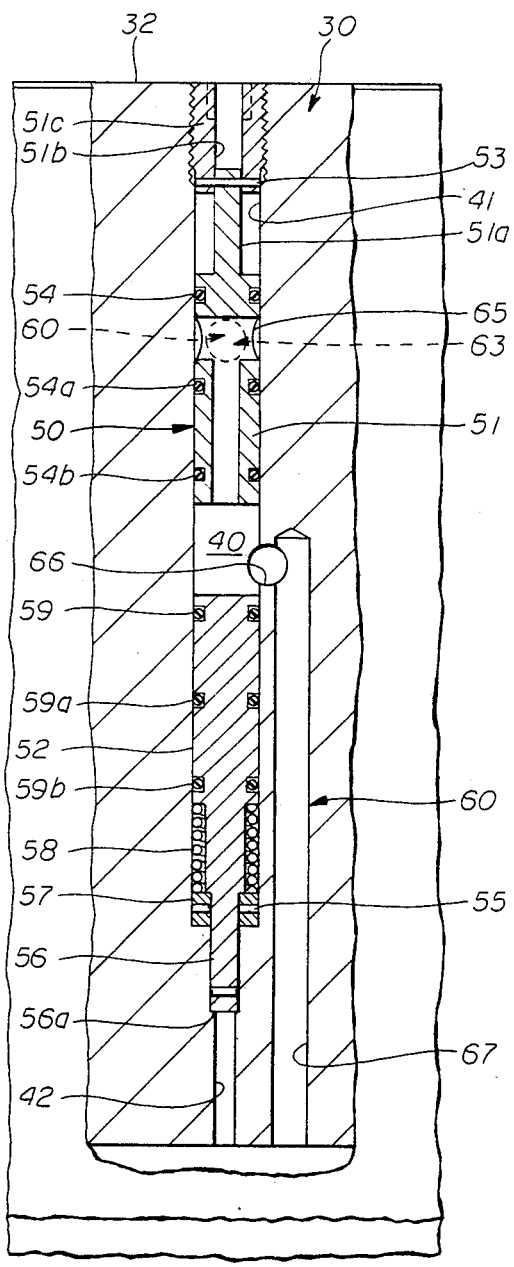
FIG. 6 is a sectional view similar to FIG. 3 and illustrating the relationship of the valve means when fluid is communicated to the interior of the inflatable element for inflation thereof.
Figure 7:
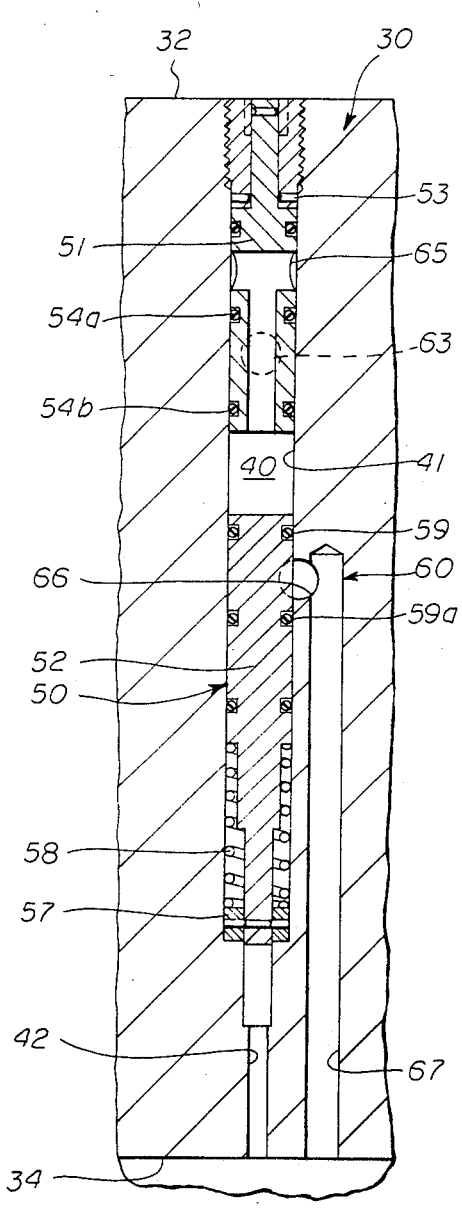
FIG. 7 is a sectional view similar to FIG. 6 but illustrating the relationship of the valve means when the element has been inflated and the valve means is moved to block off communication from the tubular member to the valve arrangement and to block off communication between the inflatable element and the bore means after inflation of the inflatable element.
Figure 8A:
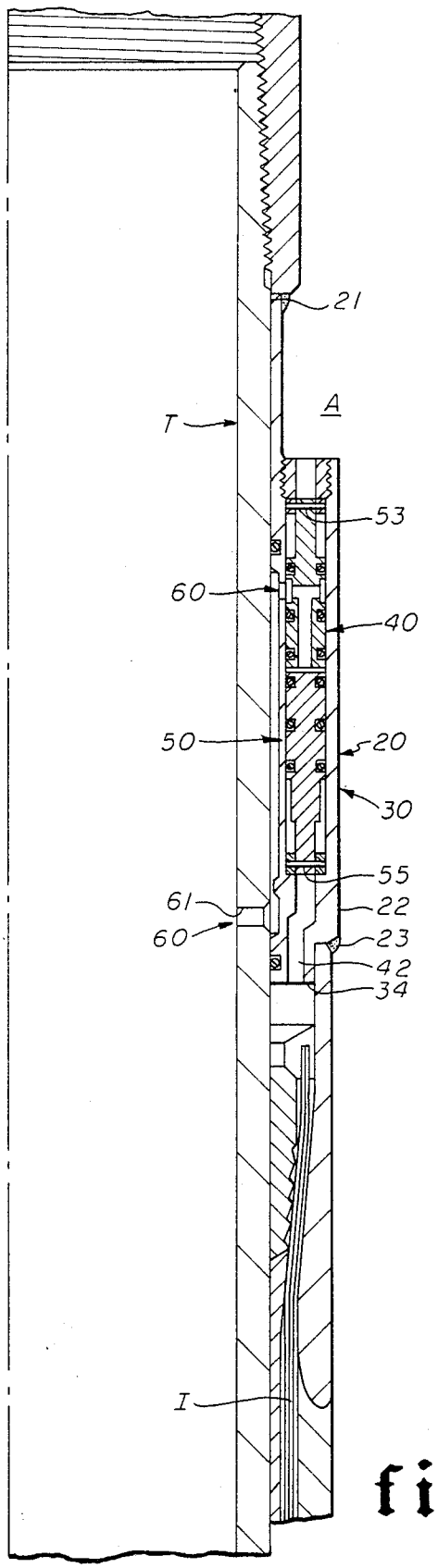
FIG. 8A is a partial longitudinal sectional view illustrating the relationship of the forms or embodiments of the valve arrangements of the present invention in relation to a tubular member and an inflatable element carried on the tubular member.

Attention is first directed to FIG. 8A of the drawings wherein the present invention is referred to generally by the numeral 20. While the embodiment of FIGS. 1-7 is illustrated in FIG. 8A, it can be appreciated that the embodiment of FIGS. 9-15 would be similarly received on a tubular member represented generally by the letter T in FIG. 8A.

Figure 8B:
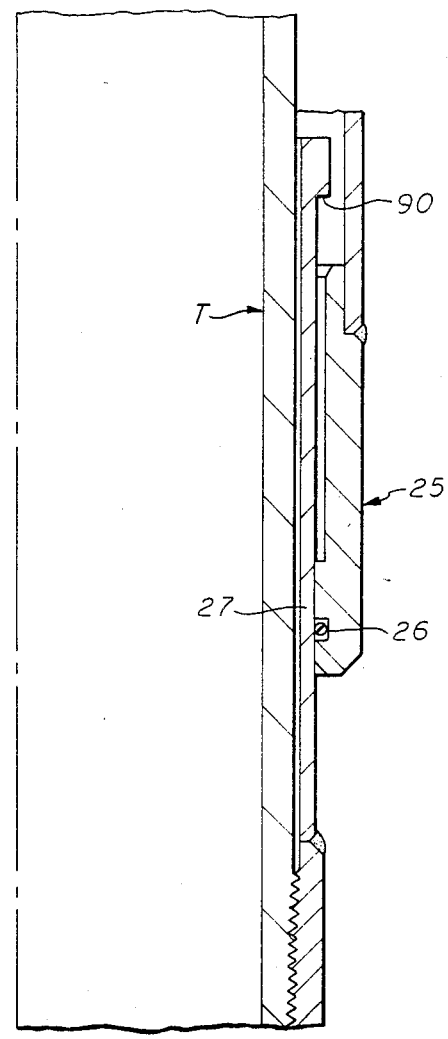
FIG. 8B is a continuation of FIG. 8A.
Figure 10:
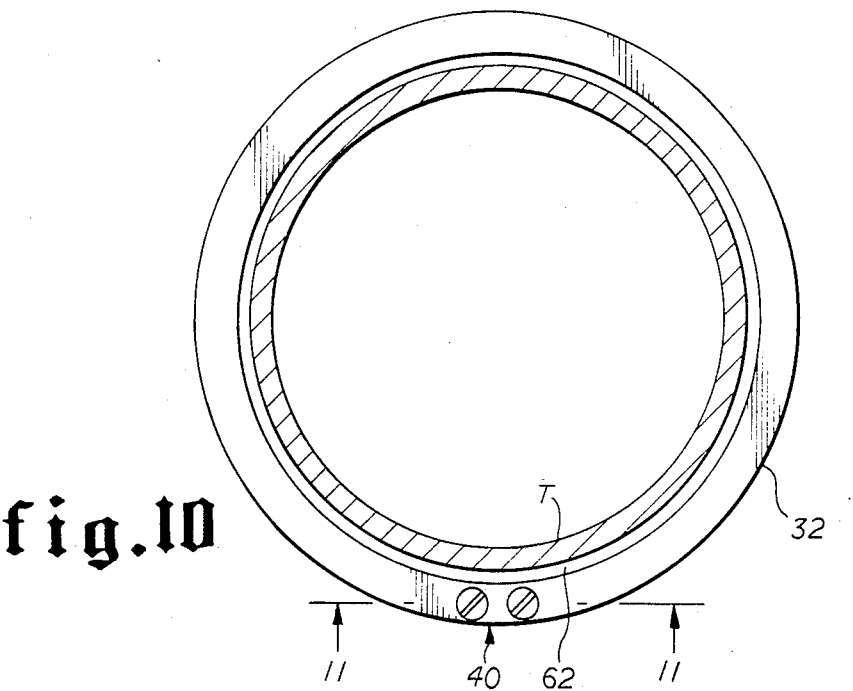
FIG. 10 is a sectional view, partly in end elevation, on the line 10—10 of FIG. 1.
Figure 9:
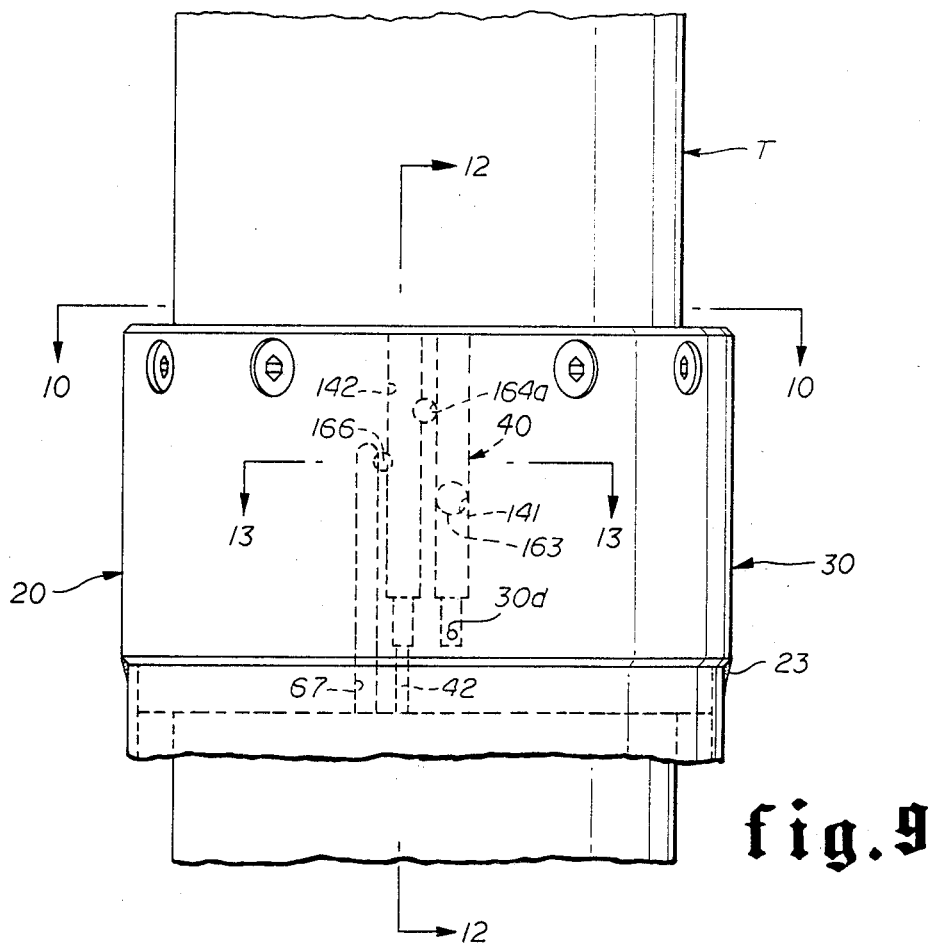
FIG. 9 is a view similar to FIG. 1 and illustrating an alternate embodiment of the valve control arrangement.
Figure 13:
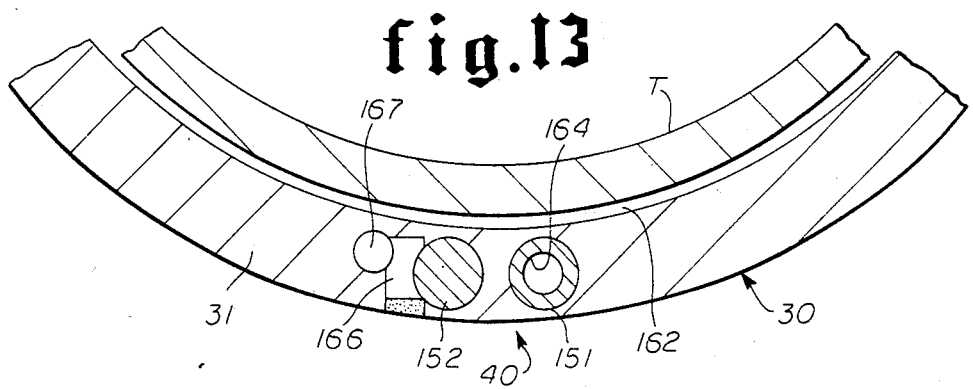
FIG. 13 is a sectional view illustrating a bore and passage arrangement of the alternate embodiment of the present invention.

The valve means represented generally by the numeral 50 is positioned within an annular housing means represented generally at 30, which valve housing means 30 may be slipped longitudinally over the tubular member T to position it properly on the tubular member in relation to passage or port 61 in tubular member T for receiving inflating fluid from the tubular member T to communicate the fluid to the inflatable element designated by the letter I, carried in a manner well known in the art on the exterior annular surface of the tubular member T as shown in FIGS. 8A and 8B. One end 21 of the annular valve housing means 20 is secured to the tubular member T by suitable means such as welding as illustrated in FIG. 8, and the other end portion 22 of the annular valve housing means 30 is secured by suitable means such as welding or the like as illustrated at 23 to one end 24 of the support for the inflatable element I. As shown in FIG. 8B, the other end portion 25 of the inflatable element I is slidable longitudinally relative to the tubular member T as the element inflates, such end portion 25 of the inflatable element I being provided with suitable seal means referred to generally at 26 to slidably and sealably engage the annular skirt 27 which is secured to the tubular member T by any suitable means such as welding to accommodate sliding, sealing movement of the end portion 25 of the inflatable element I as it inflates. The annular shoulder 90 on skirt 27 limits the longitudinal movement of end portion 25. The tubular member T with the valve housing 30 and inflatable member I are lowered into a well bore so that one of the valve means is exposed to the pressure in the annulus A of the well bore, as will be described.

Attention is now directed to FIGS. 1-7 where one embodiment of the invention 20 is illustrated. The annular valve housing means 30 includes bore means referred to generally at 40 in which are positioned valve means referred to generally by the numeral 50.

As illustrated in FIGS. 1-7 form of the invention, the bore means 40 consists of a single cylindrical bore 41 extending longitudinally within the wall 31 of the annular valve housing 30 as shown in the drawings. The bore 41 extends from the end 32 of the annular housing and includes a portion 42 of smaller diameter than the diameter of the cylindrical bore 41 which may be termed as first additional passage means in the valve housing 30 which communicates through the other end 34 of the valve housing means 30. This first additional passage means 42 communicates inflating fluid pressure from the interior of the inflatable element I to the cylindrical bore 41 for a purpose as will be described in greater detail hereinafter.

The valve means 50 includes first valve means 51 and second valve means 52 which valve means 51, 52 are illustrated as being cylindrical piston type valve means as shown in the drawings positioned in the cylindrical bore 41.

When the first valve means 51 is positioned within the cylindrical bore 41, the smaller diameter stem 51a extending from the first valve means 51 fits within the passage 51b extending through the threaded Allen nut 51c, which nut is treadedly secured within the end portion of the cylindrical bore 41 adjacent the end 32 of the valve housing 30 as shown in the drawings. The first valve means 51 is retained in such position by any suitable means such as the shear pin 53 which engages 51a and nut 51c as shown. The shear pin means 53 also functions to release the first valve means 51 when a predetermined pressure is reached, as will be described. When the first valve means 51 is secured in the position illustrated in FIG. 3 of the drawings within the cylindrical bore means 41, the seal means 54, 54a are spaced on each side of the port means 63 in the annular valve housing, which port means 63 forms part of the passage means for communicating fluid from the interior of the tubular member T to the interior of the inflatable element I. Additional seal means 54b extending about the annular first piston valve means 51 are provided for a purpose as will be described.

The second valve means 52 is initially retained in position in the cylindrical bore 41 as shown in FIG. 3 by means of the shear pin 55. The stem 56 on valve 52 fits in the central opening of annular seat, 57, and the shear pin 55 extends through the stem 56 and the annular seat 57 adjacent one end of the cylindrical bore 41 as shown. The second valve means 52 is also provided with seal means 59, 59a which are spaced to span the passage or port 66 forming part of the passage means which communicates fluid from the tubular member T to the interior of the inflatable element I in a manner as will be described. Additional seal means 59b are spaced from the seal means 59a as shown to function in a manner as will be described. When the valve 52 is in the position shown in FIG. 3 of the drawings, communication from the bore 41 to the interior of the inflatable element I is prevented, but fluid from tubular member T to the bore 41 is permitted.

Passage means referred to generally by the numeral 60 are provided in the tubular member T and in the valve housing means 30 for communicating fluid from the interior of the tubular member T through the bore means 40 to the interior of the inflatable element I for inflation thereof.

The passage means 60 includes port means 61 extending through the wall of the tubular member T, the port means 61 in turn communicating with the annular passage 62 formed by the recessed portion on the inner annular surface 33 of the valve housing 30, which annular passage 62 in turn communicates through the port 63 in the annular valve housing with the passage 64 extending through the first valve means 51 as better illustrated in FIG. 4 of the drawings. The passage means 60 also includes annular recessed surface 65 on the first valve means 51 which aligns with the port 63 when the valve means 51 is in the position shown in FIGS. 3 and 4 to accommodate flow to the passage 64 from the tubular member T. Thus, even though seals 54, 54a span opening 63, as shown in FIG. 3 of the drawings, fluid communication from the interior of the tubular member T to the second valve means 52 is accomplished when the first valve means 51 is in such position.

Figure 2:
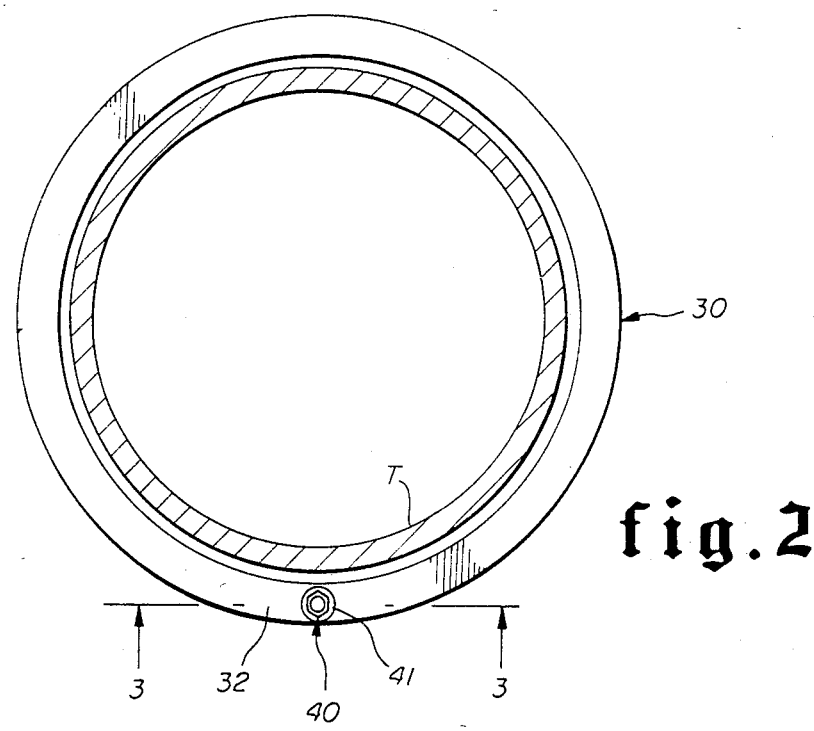
FIG. 2 is an end view, partly in section, on the line 2—2 of FIG. 1.
Figure 1:
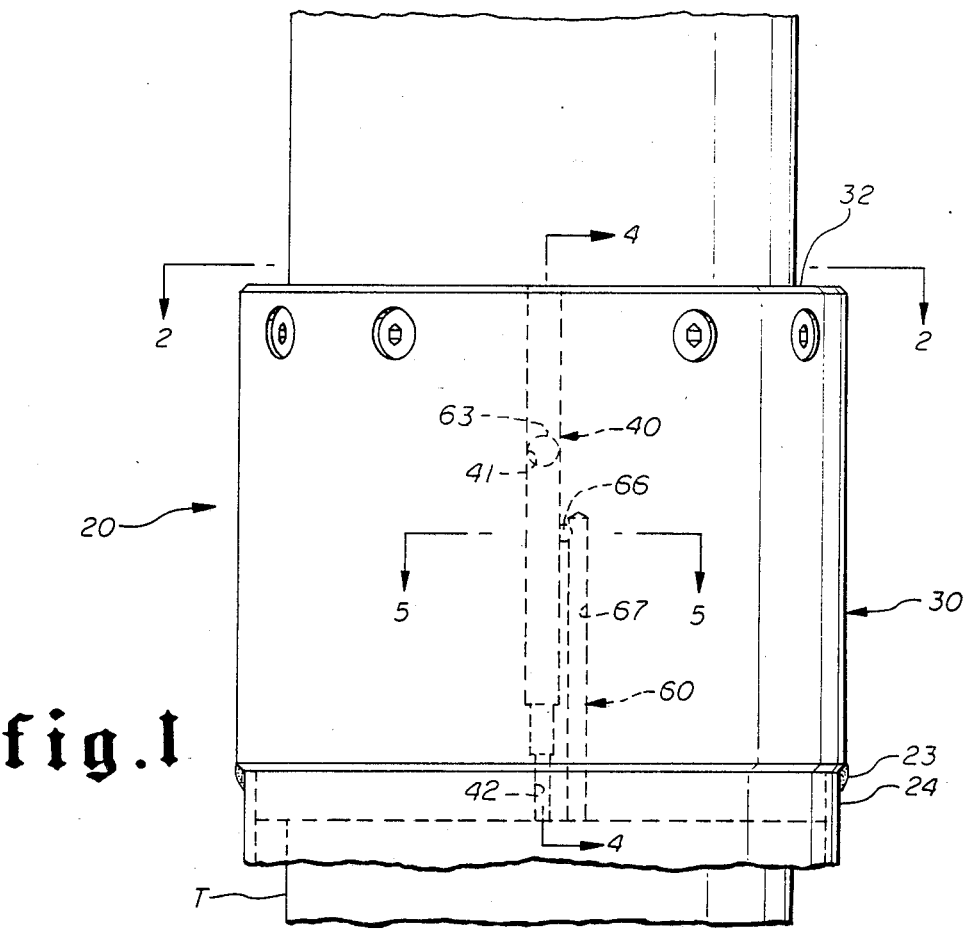
FIG. 1 is an elevational view illustrating the valve housing of the present invention positioned on a tubular member.

The passage means further includes port or passage means 66 formed in the valve housing means 30 which intersects bore means 41 and also intersects longitudinally extending passage means 67 in valve housing 30 as better in shown in FIGS. 1, 3 and 5 of the drawings. The port 66 and passage 67 serve to communicate fluid from the bore means 41 to the inflatable element I for inflation thereof when the second valve means 52 is moved to uncover the port means 66 as will be described.

The port 61, annular passage 62, port 63, recessed surface 65 and passage 64 may be termed first pasage means in the tubular member T and in the first valve means 51 for communicating fluid from the interior of the tubular member T to the second valve means 52 in bore 41. The port means 66 and passage means 67 in the valve housing means 30 may be termed second passage means which communicates fluid from the bore means 41 to the interior of the inflatable element to inflate it.

In the operation of the embodiment illustrated in FIGS. 1-7, it will be assumed that the valve housing means 30 with the valve means 50 assembled in the bore means 41 as shown in FIGS. 3 and 4 is positioned and secured on the tubular member T as shown in FIG. 8 of the drawings. Fluid from the interior of the tubular member T is conducted through the port 61, annular passage 62 and port 63 in housing 30 and through recessed surface 65 and passage 64 in the first valve means 51 to exert pressure on the second valve means 52. However, the second valve means 52 is retained in the position shown in FIGS. 3 and 4 of the drawings by retaining means 55 until the retaining means 55 is sheared.

By way of example only, it will be assumed that it is desired for the shear pin 55 to retain the second valve means 52 in the position shown in FIGS. 3 and 4 of the drawings until the pressure exerted in bore 41 against the valve means 52 reaches 500 pounds per square inch. In such event, the shear pin will be constructed to shear at 500 pounds pressure. When this pressure is reached, the shear pin 55 shears and releases the valve means 52 so that it may move against the force of spring 58 to the position illustrated in FIG. 6 of the drawings so that the stem 56 thereof abuts against the shoulder 56a formed in the smaller bore portion 42. Movememt of the second valve means 52 collapses spring 58 as shown in FIG. 6, but first valve means 51 retains the position illustrated in FIGS. 3, 4 and 6 to continue to communicate inflating fluid from the interior of the tubular member T to the interior of bore 41 for subsequent flow to the inflatable element I through port 66 and passage 67. Such fluid communication will continue until the desired final inflating pressure of the inflatable element is reached, which is any desired predetermined pressure differential between the annulus A of the well bore in which the invention 20 is positioned, and the pressure existing in the bore 41 adjacent port 63.

It will be noted that one end of bore 41 is exposed to the pressure of the well bore annulus A since the passage 51b communicates with the annulus through the nut 51c. The desired pressure differential between annulus A and bore 41 is predetermined, and for purposes of illustration, it will be assumed that such desired pressure differential is 1500 pounds per square inch which is higher than the first pressure of 500 pounds at which 55 shears. When this second higher pressure differential is reached, the shear retaining means 53 will shear at this second predetermined desired pressure which then releases the first valve means 51 so that it moves longitudinally within cylindircal bore 41 to the position illustrated in FIG. 7 of the drawings. When this occurs, communication from the interior of the tubular member T to the bore means 40 through the first passage means is shut off since the first valve means 51 is moved longitudinally in bore 41 which misaligns port 63 and surface 65 on first valve means 51 and positions seal means 54a and 54b so as to span the port 63 and close it off as shown in FIG. 7, thereby preventing communication from the tubular member T to the interior of the cylindrical bore 41.

Also, at the such time, inflating fluid pressure within the inflatable element I acts through the first additional passage means 42 on the second valve means 52, and such pressure along with the spring means 58 moves the second valve means 52 so that the seal means 59 and 59a span the passage or port 66 and close off communication between the second passage means and the interior of the inflatable element I as represented in FIG. 7. Further, any pressure in the annulus A acting externally of the inflatable element I will act on such inflated element and be transmitted through the fluid therein to the passage means 42 to thus aid in retaining the second valve means 52 in position to prevent communication of the interior of the inflated element with the interior of the tubular member T during subsequent well treating operations.

From the foregoing, it can be appreciated that the present invention provides an arrangement so that after the inflatable element I has been inflated, the first valve means is released not only to shut off further inflating pressure, but it prevents communication between the tubular member T and the cylindrical bore 41. Additionally, as noted above, the second valve means 52 moves to close off communication between the second passage means and the cylindrical bore 41 to prevent communication of any further inflating fluid to the interior of the inflated element I, and the arrangement is constructed to utilize the pressure in the annulus and in the inflated element to retain the second valve 52 in closed position to retain the inflating fluid in the inflated element.

Attention is now directed to the embodiment illustrated in FIGS. 10-15 inclusive, where like numerals are employed to represent like components.

An annular valve housing 30 is adapted to be positioned on the exterior of the tubular member T in a manner as described with regard to the embodiment shown in FIGS. 1-7 and explained in regard to FIGS. 8A and 8B. The valve housing means 30 is provided with bore means 40 for receiving valve means 50 therein for controlling communication between the interior of the tubular member T and the interior of the inflatable element I for inflation thereof. The annular valve housing means 30 of the FIGS. 10-15 embodiment is slidably positioned on the exterior of the tubular member T and secured in position thereon adjacent the element I by any suitable means such as welds, threaded bolts or the like.

Fluid passage means represented generally at 160 are provided in the tubular member T and in the valve housing means 30 for communicating fluid from the interior of the tubular member T through the bore means 40 in the valve housing means 30 to the interior of the inflatable element I for inflation thereof.

Figure 11:
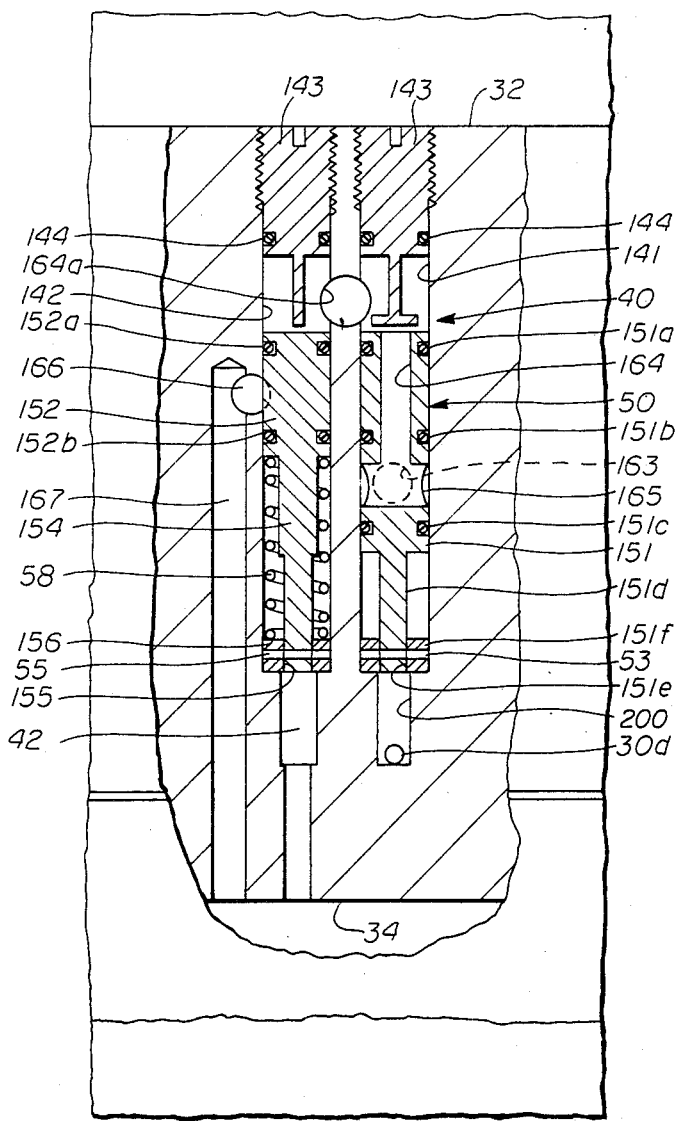
FIG. 11 is a partial sectional view of the valve housing means on the line 11—11 of FIG. 10.
Figure 12:
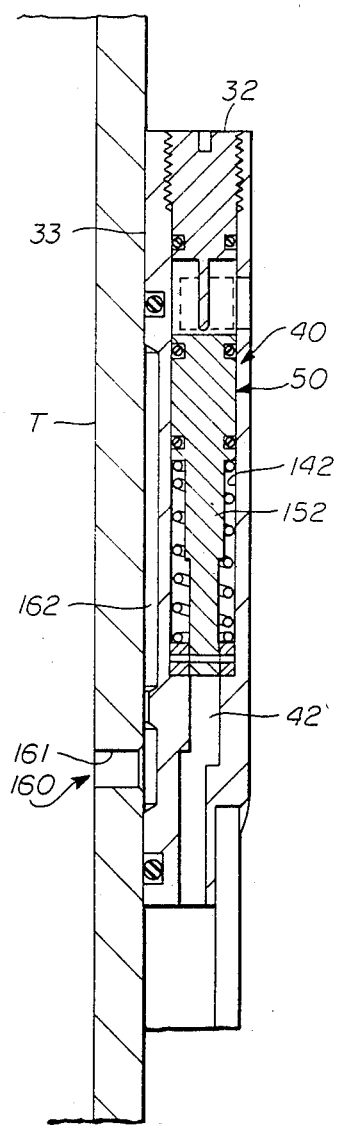
FIG. 12 is a sectional view on the line 12—12 of FIG. 9.

More specifically, in the FIGS. 10-15 embodiment, the bore means 40 comprises a pair of cylindrical, longitudinally extending bores 141 and 142. Each bore 141 and 142 may be formed by drilling a hole in the annular wall 31 of the valve housing means 30 from adjacent an end 32 thereof the threading the end portion of each bore 141, 142 as shown in FIG. 11. A threaded plug 143 having seal means 144 thereon is secured in the threaded end of each bore 141, 142.

The valve means 40 may be further identified as a first valve means 151 which is received within the cylindrical bore 141 and the second valve means 152 which is received in the second cylindrical bore 142 as shown in FIG. 11 of the drawings. The valve means 151, 152 are shown as being piston type valves for slidably fitting within the bores 141, 142, respectively, and the valve 151 is provided with the annular seals 151a, 151b and 151c for sealably engaging within the bore 141. The valve means 152 is provided with seal means 152a and 152b for sealably and slidably fitting within the bore 142. A stem 151d extends from the valve 151 and is engaged in the opening 151e of the annular member 151f by means of the shear pin 153. A reduced bore 200 communicates with the cylindrical bore 141 at one end adjacent member 151f and with the annulus A in the well bore in which the device is employed by means of the port or passage 30d in the annular housing means 30.

The valve 152 is provided with a stem 154 which fits within the opening 155 of the annular member 156 and is held in position therein by means of the shear pin 55.

When the valve housing 30 is initially positioned on the tubular member T as illustrated in FIG. 8A of the drawings, the valve means 151 and 152 are positioned as illustrated in FIG. 11 of the drawings so that each is shear pinned to retain it in the position illustrated in FIG. 11 of the drawings.

The passage means 160 includes the port means 161 extending through the wall of the tubular member T which communicates with the annular recess 162 formed on the inner annular surface 33 of the valve housing 33. The valve 151 is provided with an annular reduced portion 165 as shown in FIG. 11 for communicating fluid from port means 163 in valve housing (which port means 163 communicates with the annular passage 162) through the passage means 164 in first valve means 151 and then through the passage 164a to the second bore means 142. The passage 164a intersects both bores 141, 142 as shown.

Port 166 in valve housing 30 communicates with second bore means 142 and with longitudinally extending passage means 167 for communicating fluid from the second bore means 142 to the interior of the inflatable element I when the second valve means has been moved to expose or uncover the port means 166.

It will be noted that a reduced bore 42, which may be termed first additional passage means, communicates with one end of the second bore 142 and with the end 34 of the annular housing means 30 adjacent element I.

The port means 161, annular passage 162, port means 163, reduced portion 165, passage means 164 and port means 164a may be termed as first passage means in the tubular member and in the first valve means 141 for communicating fluid from the interior of the tubular member T to the second valve means 152. The port means 166 and passage means 167 may be termed as second passage means in the valve housing means for communicating fluid from the bore means 40 to the interior of the inflatable element I to inflate it.

The operation of this embodiment of the invention is similar to that described with regard to the embodiment of FIGS. 1-7, inclusive.

As noted previously, when the valve housing 30 is positioned on the tubular member T as described with regard to FIG. 8A, the valve means 50 comprising the first valve means 151 and the second valve means 152 are positioned within their respective first and second cylindrical bores 141 and 142 as shown in FIG. 11 and are initially retained in such position by means of the shear pins 53 and 55, respectively. When it is desired to inflate the inflatable element I of FIG. 8A, fluid is communicated from the interior of the tubular member through the port means 161, passage means 162, port means 162, port means 163, reduced portion 165, passage means 164 and port means 164a to act against the second valve means 152 in the second bore 142. Fluid communication to the interior of the inflatable element is prevented since the valve means 152 is retained in position in bore 142 to close off the port means 166 as shown in FIG. 11.

Figure 14:
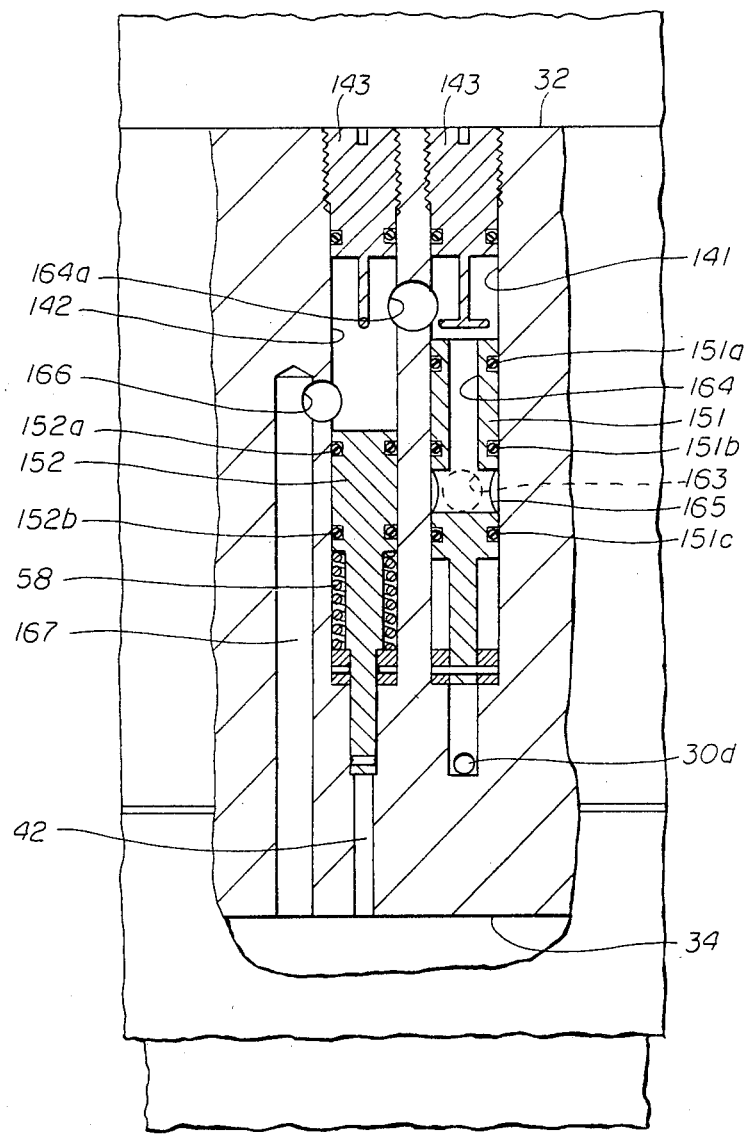
FIG. 14 is a sectional view similar to FIG. 11 of the alternate embodiment and illustrating the position of the valve means when fluid is communicated to the interior of the inflatable element for inflation thereof.

When the first predetermined pressure, such as 500 pounds, is reached in the second bore 142, the shear pin 55 shears, releasing second valve means 152 to move longitudinally of the second bore 142 as shown in FIG. 14 of the drawings. This exposes port 166 so that fluid may flow from the bore means 40 and tubular member T to the inflatable element I through the longitudinal passage 167. Such fluid communication is continued, and valves 151, 152 will remain in the position shown in FIG. 14 until the desired inflate pressure is reached. This inflate pressure is predetermined, as previously noted, and when it is reached, shear pin means 53 then shears. The inflating pressure is higher than the initial pressure exerted on the second valve means 52, and, for example, the second predetermined pressure may be 1,500 pounds at which time the shear pin means 53 will shear to release first valve means for movement. In this connection, it is to be noted that the reduced bore 200 communicates one end of the piston means with the annulus pressure by means of the port 30d in the valve housing 30 so that in effect the pressure at which shear pin means 53 releases the first valve means 151 for movement longitudinally of the cylindrical bore 141 is the pressure differential in the bore 141 on one side of the piston means and the pressure in the well bore annulus A.

Figure 15:
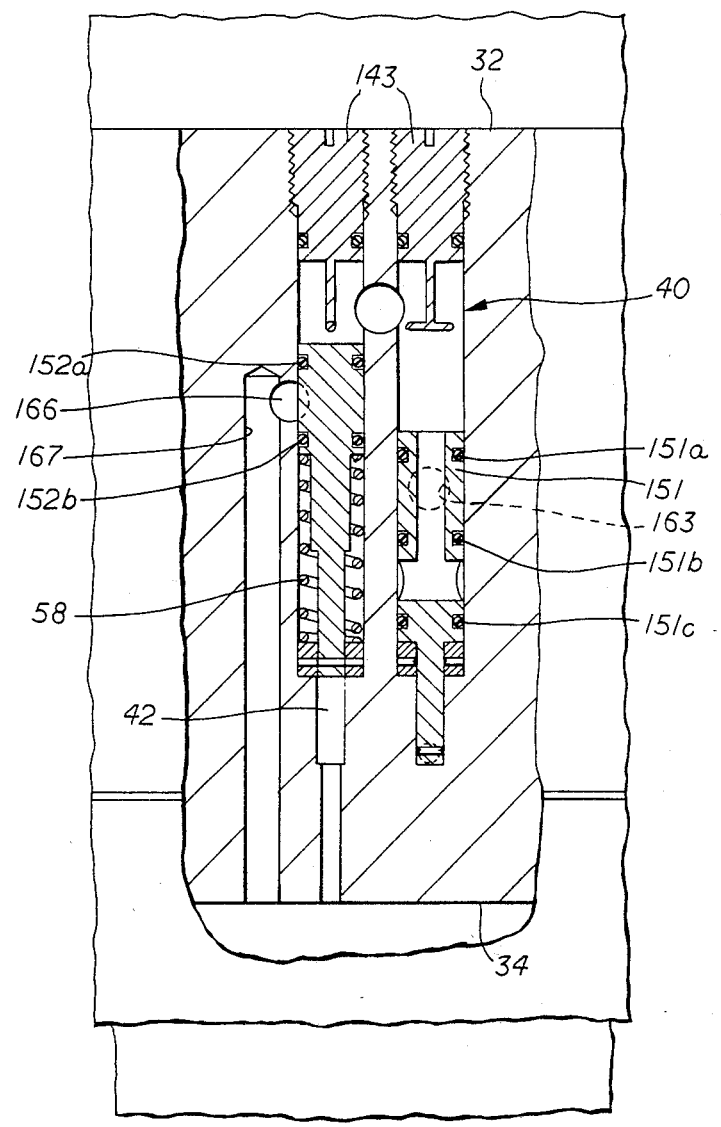
FIG. 15 is a sectional view similar to FIG. 14 and illustrating the position of the valve arrangement when the valve means blocks off communication of fluid from the interior of the tubular member to the valve means and when the valve means blocks off communication from the interior of the inflatable element to the tubular member after inflation of the tubular element.

As noted, when inflating pressure has been reached, then shear pin 53 shears and releases first valve means 151 so that it moves to the position shown in FIG. 15 of the drawings. When valve 151 moves to the position shown in FIG. 15, entry port 163 to the bore means 40 is sealed off by seals 151a and 151b, thereby preventing fluid communication from tubular member T to the interior of the bore means 40 to act on the second valve means 152. Also, spring means 58 along with inflating pressure internally of the inflated element I which pressure acts through the small bore 42 moves second piston means 152 to the position shown in FIG. 15 so that seals 152a and 152b block off port means 166 and thus prevent communication between the inflated pressure within the inflatable element I and the bore means 40.

From the foregoing description, it can be seen that positive means to block inflating pressure from the tubular member to the bore means is provided, and similarly, communication between the inflated element and the bore means in prevented. This arrangement effectively locks both valve means of both embodiments in position preventing undesired communication between the interior of the inflated element and the bore means as well as undesired communication between the interior of the tubular member and the bore means. Further, annulus pressure cooperates with the fluid in the inflated element to retain the second valve means in a position so as to block off communication between the interior of the inflated element I and the bore means, rather than acting on any part of the arrangement to tend to cause the valve means to release which would expose the interior of the inflated element I to undesired pressure existing action either in the well bore annulus A or in the tubular member T.

The foregoing disclosure and description of the invention are illustrative and explanatory thereof, and various changes in the size, shape and materials as well as in the details of the illustrated construction may be made without departing from the spirit of the invention.

What is claimed is:

1. An arrangement for controlling fluid communication between the interior of a tubular member and the interior of an inflatable element supported externally on the tubular member, comprising:
   a. a tubular member and a valve housing means adapted to be supported on the tubular member;
   b. there being bore means in said valve housing means;
   c. passage means in the tubular member and in said valve housing means for communicating fluid from the interior of the tubular member through the bore means to the interior of the inflatable element to inflate it;
   d. first valve means in said bore means for controlling fluid flow into the bore means, said first valve means having a first portion exposed to a pressure of an annulus surrounding said tubular member, and having a flow pathway for communicating flow from the interior of the tubular member through a second portion of said first valve means and into said bore means, said first valve means disposed in said bore means in an open configuration so that flow may be communicated from said passage means through said pathway of said first valve means and into said bore means;
   e. second valve means in said bore means for controlling fluid flow from the bore means to an inflatable element, said second valve means having a first portion in communication with flow from the second portion of said first valve means and a second portion in communication with an external pressure from said element;
   f. means to retain said second valve means in a closed position in said bore means to close off flow to the inflatable element until a first predetermined pressure differential is reached in said bore means, and for releasing said second valve means so that it may move to an open position and communicate said bore means for flow to the interior of the inflatable element when the first predetermined pressure differential is reached, said means for releasing said second valve means including pressure responsive means so that said second valve means moves to its open position responsive to a higher pressure in said bore means acting on the first portion of said second valve means and a lower pressure from said element acting on the second portion of said second valve means;
   g. means to retain said first valve means in an open position in said bore means to accommodate flow to said bore means until a second predetermined pressure differential between the pressure in said bore means and said pressure of the annulus, which is higher than said first predetermined pressure, is reached in said bore means, and for releasing said first valve means to move to a closed position and close off flow to said bore means when the second predetermined pressure differential is reached, said means for releasing said first valve means including pressure responsive means so that said first valve means closes in response to a pressure differential between a higher pressure in said bore means between the portions of said first and said second valve means acting of the second portion of said first valve means and a lower pressure in the annulus acting of the first portion of said first valve means; and h. means for moving said second valve means to its closed position in said bore means and close off flow to an inflatable element, said means for moving said second valve means to its closed position including pressure responsive means so that said second valve means closes in response to a pressure differential between a higher fluid pressure from said inflatable element and a lower fluid pressure in said bore means.

2. The arrangement of claim 1 including first additional passage means in said valve housing means for communicating the interior of the inflatable element with said second valve means whereby the inflating fluid pressure within the inflatable element tends to urge said second valve means toward a position to close off inflating fluid flow into the inflatable element.

3. The arrangement of claim 1 including resilient means associated with said second valve means tending to urge said second valve means from an open position toward a closed position to close off inflating fluid flow into the inflatable element.

4. The arrangement of claim 1 wherein said bore means consists of a single cylindrical bore and wherein said first and second valve means comprise piston valve means sealably received and longitudinally aligned in said bore means.

5. The arrangement of claim 1 wherein said valve housing means includes second additional passage means for communicating annulus pressure to act on said first valve means.

6. The arrangement of claim 1 wherein said bore means consists of first and second cylindrical bores with said first valve means positioned in said first cylindrical bore and said second valve means positioned in said second cylindrical bore.

7. The arrangement of claim 1 which is constructed and arranged to employ annulus pressure to act on said second valve means to maintain it closed to close off communication to the inflatable element after it has been inflated to the predetermined pressure.

8. The arrangement of claim 2 including resilient means associated with said second valve means tending to urge said second valve means from an open position toward a closed position to close off inflating fluid flow into the inflatable element.

9. The arrangement of claim 2 wherein said bore means consists of a single cylindrical bore and wherein said first and second valve means comprise piston valve means sealably received and longitudinally aligned in said bore means.

10. The arrangement of claim 2 wherein said valve housing means includes second additional passage means for communicating annulus pressure to act on said first valve means.

11. The arrangement of claim 2 wherein said bore means consists of first and second cylindrical bores with said first valve means positioned in said first cylindrical bore and said second valve means positioned in said second cylindrical bore.

12. The arrangement of claim 2 wherein said bore means consists of first and second cylindrical bores with said first valve means positioned in said first cylindrical bore and said second valve means positioned in said second cylindrical bore.

13. An arrangement for controlling fluid communication between the interior of a tubular member and the interior of an inflatable element supported externally on the tubular member, comprising:

a. tubular member and a valve housing means adapted to be supported on the tubular member;

b. there being bore means in said valve housing means;

c. first and second valve means disposed in said bore means, said first valve means having a first portion therein exposed to a pressure of an annulus surrounding said tubular member, and having a flow passage therein for communicating flow from the interior of the tubular member through a second portion of said first valve means and into said bore means, said first valve means disposed in said bore means in an open configuration so that flow may be communicated from said passage means through said first valve means and into said bore means, said second valve means having a first portion in communication with flow from the second portion of said first valve means and a second portion in communication with an external pressure from said inflatable element;

d. first passage means in the tubular member and in said first valve means for communicating fluid from the interior of the tubular member to said second valve means, said passage means including the flow passage in said first valve means;

e. second passage means in said valve housing means for communicating fluid from said bore means to the interior of the inflatable element to inflate it;

f. means to retain said second valve means in a closed position in said bore means to close off said second passage means until a first predetermined pressure differential is reached between a higher pressure in said bore means acting on the first portion of said second valve means and a lower pressure from said inflatable element acting on the second portion of said second valve means, and for releasing said second valve means responsive to the first pressure differential so that it may move to an open position and communicate said second passage means with said bore means when the first predetermined pressure differential is reached;

g. means to retain said first valve means in an open position in said bore means to communicate fluid to said second valve means until a second predetermined pressure differential between the pressure in said bore means and a pressure in the annulus, which is higher than said first predetermined pressure, is reached in said bore means, and for releasing said first valve means to move to a closed position and close off fluid communication to said second valve means when the second predetermined pressure differential is reached;

h. means for moving said second valve means to its closed position in said bore means and close off flow to the inflatable element, said means for moving said second valve means to its closed position including pressure responsive means so that said second valve means closes in response to a pressure differential between a higher pressure from said inflatable element acting on the second portion of said second valve means and a lower fluid pressure in said bore means acting on the first portion of said second valve means; and i. means for retaining said first valve means in its closed configuration so that further fluid flow to said bore means and said element is blocked, said means including pressure responsive means so that a pressure differential between a higher pressure from said element and a lower pressure in the annulus retains said first valve means closed, said higher pressure biasing against said second valve means and being transmitted to act on said first valve means by said second valve means and a fluid trapped in said bore means by the closing of said first valve means and the closing of said second valve means.

14. The arrangement of claim 3 including first additional passage means in said valve housing means for communicating the interior of the inflatable element with said second valve means whereby the inflating fluid pressure within the inflatable element tends to urge said second valve means toward a position to close off inflating fluid flow into the inflatable element.

15. The arrangement of claim 13 including resilient means associated with said second valve means tending to urge said second valve means from an open position toward a closed position to close off inflating fluid flow into the inflatable element.

16. The arrangement of claim 13 wherein said bore means consists of a single cylindrical bore and wherein said first and second valve means comprise piston valve means sealably received and longitudinally aligned in said bore means.

17. The arrangement of claim 13 wherein said valve housing means includes second additional passage means for communicating annulus pressure to act on said first valve means.

18. The arrangement of claim 13 wherein said bore means consists of first and second cylindrical bores with said first valve means positioned in said first cylindrical bores with said first valve means positioned in said first cylindrical bore and said second valve means positioned in said second cylindrical bore.

19. The arrangement of claim 13 wherein said bore means consists of first and second cylindrical bores with said first valve means positioned in said first cylindrical bore and said second valve means positioned in said second cylindrical bore.

20. The arrangement of claim 14 including resilient means associated with said second valve means tending to urge said second valve means from an open position toward a closed position to close off inflating fluid flow into the inflatable element.

21. The arrangement of claim 14 wherein said bore means consists of a single cylindrical bore and wherein said first and second valve means comprise piston valve means sealably received and longitudinally aligned in said bore means.

22. The arrangement of claim 14 wherein said valve housing means includes second additional passage means for communicating annulus pressure to act on said first valve means.

23. The arrangement of claim 14 wherein said bore means consists of first and second cylindrical bores with said first valve means positioned in said first cylindrical bore and said second valve means positioned in said second cylindrical bore.

24. The arrangement of claim 14 wherein said bore means consists of first and second cylindrical bores with said first valve means positioned in said first cylindrical bore and said second valve means positioned in said second cylindrical bore.

25. The arrangement of claim 13 which is constructed and arranged to employ annulus pressure to act on said second valve means to maintain it closed to close off communication to the inflatable element after it has been inflated to the predetermined pressure.

26. An arrangement for controlling fluid communication between the interior of a tubular member and the interior of an inflatable element supported externally on the tubular member, comprising:

a. a tubular member and a valve housing means adapted to be supported on the tubular member;

b. there being bore means in said valve housing means;

c. passage means in the tubular member and in said valve housing means for communicating fluid from the interior of the tubular member through the bore means to the interior of the inflatable element to inflate it;

d. first piston valve means in said bore means for controlling fluid flow into the bore means, said first valve means having a first end exposed to a pressure of an annulus surrounding said tubular member, and having a flow passage therein for communicating flow from the interior of the tubular member through an opposite second end of said first valve means and into said bore means, said first valve means disposed in said bore means in an open configuration so that flow may be communicated from said passage means through said first valve means and into said bore means;

e. second piston valve means in said bore means for controlling fluid flow from the bore means to the inflatable element, said second valve means having a first end in communication with flow from the second end of said first valve means and a second opposite end in communication with an external pressure from said element;

f. means to retain said second valve means in a closed position in said bore means to close off flow to the inflatable element until a first predetermined pressure differential is reached in said bore means, and for releasing said second valve means so that it may move to an open position and communicate said bore means for flow to the interior of the inflatable element when the first predetermined pressure differential is reached, said means for releasing said second valve means including pressure responsive means so that said second valve means moves to its open position responsive to a higher pressure in said bore means acting on first end of said second valve means and a lower pressure from said element acting on the second end of said second valve means;

g. means to retain said first valve means in an open position in said bore means to accommodate flow to said bore means until a second predetermined pressure differential between the pressure in said bore means and a pressure of the annulus, which is higher than said first predetermined pressure, is reached in said bore means, and for releasing said first valve means to move to a closed position and close off flow to said bore means when the second predetermined pressure differential is reached, said means for releasing said first valve means including pressure responsive means so that said first valve means closes in response to a pressure differential between a higher pressure in said bore means between the ends of said first and said second valve means and a lower pressure in the annulus acting on the first end of said first valve means;

h. means for moving said second valve means to its closed position in said bore means and close off flow to the inflatable element, said means for moving said second valve means to its closed position including pressure responsive means so that said second valve means closes in response to a pressure differential between a higher external pressure from inflatable said element and a lower fluid pressure enclosed in said bore means between the ends of said first and second valve means having fluid communication; and i. means for retaining said first valve means in its closed configuration so that further fluid flow to said bore means and said element is blocked, said means including pressure responsive means so that a pressure differential between a higher pressure from inflatable said element and a lower pressure in the annulus retains said first valve means closed, said higher pressure biasing against the second end of said second valve means and being transmitted to act on said first valve means by said second valve means and a fluid enclosed in said bore means by the closing of said first and second valve means, the fluid being enclosed therein between the ends of said first and second valve means that are in fluid communication.

* * * * *